US00RE34003E

United States Patent [19]

Weng

[11] E Patent Number: Re. 34,003

[45] Reissued Date of Patent: Jul. 21, 1992

[54] METHOD AND APPARATUS FOR ENCODING AND MAPPING MAGNETIC DISK SECTOR ADDRESSES

[75] Inventor: Lih-Jyh Weng, Lexington, Mass.

[73] Assignee: Digital Equipment Corporation, Maynard, Mass.

[21] Appl. No.: 592,908

[22] Filed: Oct. 4, 1990

Related U.S. Patent Documents

Reissue of:

[64] Patent No.: 4,949,200
Issued: Aug. 14, 1990
Appl. No.: 176,093
Filed: Mar. 31, 1988

[51] Int. Cl.[5] ..... G11B 5/012
[52] U.S. Cl. ..... 360/72.2
[58] Field of Search ..... 360/72.2, 72.1, 38.1, 360/39

[56] References Cited

U.S. PATENT DOCUMENTS

| | | | |
|---|---|---|---|
| 4,151,571 | 4/1979 | Cardot et al. | 360/77.08 |
| 4,507,693 | 3/1985 | Matsuda et al. | 360/72.2 |
| 4,564,945 | 1/1986 | Glover et al. | 360/38.1 |
| 4,622,602 | 11/1986 | Kutaragi | 360/49 |
| 4,630,140 | 12/1986 | Sugimura et al. | 360/49 |
| 4,661,956 | 4/1987 | Izumita et al. | 371/38 |
| 4,697,212 | 9/1987 | Osawa et al. | 360/48 |

FOREIGN PATENT DOCUMENTS

| | | | |
|---|---|---|---|
| 0109551 | 10/1983 | European Pat. Off. . | |
| 0164891 | 5/1985 | European Pat. Off. . | |
| 0248536 | 5/1987 | European Pat. Off. . | |
| 58-177537 | 10/1983 | Japan . | |
| 59-163124 | 2/1986 | Japan . | |
| 62-18681 | 1/1987 | Japan | 360/49 |
| 60-157770 | 1/1987 | Japan . | |

*Primary Examiner*—John H. Wolff
*Attorney, Agent, or Firm*—Cesari & McKenna

[57] ABSTRACT

Addresses corresponding to magnetic disk sectors are encoded using an error correction code (ECC), such that addresses which are in a neighborhood, that is, addresses which are mathematically or numerically close, are mapped to addresses which differ in at least D−1 bits where the ECC is a distance D code. An original n-bit sector address is separated into two segments. One segment is a "k"-bit neighborhood address segment containing the k lower order address bits identifying the location of the selected sector within a neighborhood. The second segment is an "n-k" bit higher order address segment identifying the neighborhood containing the selected sector. The k-bit neighborhood address segment is then encoded with an (n,k) distance D linear code to form an n-bit preliminary code word containing n-k redundancy (ECC) bits appended, as the most significant bits, to the k neighborhood address bits. The (n-k)-bit higher order address segment is encoded by representing the segment in Gray code. The (n-k)-bit Gray coded segment is added modulo 2 to the n-k redundancy (ECC) bits of the preliminary code word. The resulting n-bit address code word is recorded on the disk as the sector address. When a particular sector is to be accessed, the address is first encoded in the manner set forth above, and the read/write head is moved to the logical neighborhood containing the sector. The encoded address is then compared to the addresses written in the various sectors in the neighborhood. When a match within (D−2)/2 bits is found, the sector is identified as the correct sector.

41 Claims, 1 Drawing Sheet

METHOD AND APPARATUS FOR ENCODING AND MAPPING MAGNETIC DISK SECTOR ADDRESSES

Matter enclosed in heavy brackets [ ] appears in the original patent but forms no part of this reissue specification; matter printed in italics indicates the additions made by reissue.

FIELD OF INVENTION

This invention relates to computer systems in general and more particularly to methods for locating stored data on a magnetic disk.

DESCRIPTION OF THE PRIOR ART

Computer systems often use peripheral storage devices, such as rotating magnetic disks, to store data. The data is stored on the disks in circuit tracks. Each track is divided into a number of sectors usually consisting of a fixed number of bytes, that is, eight-bit symbols. Each sector, in turn, consists of two sections, a header section and a data section. The sector is uniquely identified by address symbols which are recorded in the header section of the sector when the disk is formatted.

A disk drive has one or more read/write heads which must be positioned over sectors to perform storage or retrieval ("write" or "read") operations in those sectors. Each read/write head is associated with one surface, or a portion of the surface, of a disk. The radial positioning of the heads is typically controlled by a single head positioner. Thus when a read or write operation is to be performed in a particular sector, the head positioner moves the heads radially to (approximately) position the appropriate head over the track containing the identified sector. Disk rotation then moves the successive sectors in the selected track under the head.

The selected head must read each sector address as it moves by and determine whether or not the sector is the correct sector. This determination must be made by the time the end of the address portion of the sector has reached the read/write head. That is, if the drive is to perform a read or write operation in a sector, it must be ready to do so when the data portion of the sector, which closely follows the address portion, rotates under the head.

In order to determine if a sector is the correct sector, the drive reads the sector address from the disk and then compares it with the specified address of the sector in which data is to be read or written. If the addresses match, the data will be read from or written to the sector.

If an address as read from a sector contains any errors, the sector may be mistakenly identified as another sector. Thus when the head is actually located over sector 100, the address may, for example, be identified as sector 101 because of the errors, and the read or write operation that is to occur at sector 101 will be performed in the wrong sector. In order to avoid misinterpreting the address of a sector, the sector addresses must be written on the disk in such a way that even with a number of errors in a retrieved address, that is, the address as it is read from the disk, the sector will be correctly identified.

In a prior method for coping with errors in a sector address, the address is recorded several times, in succession. The specified sector address is compared with each copy of the address stored in the sector, and if some minimum number of retrieved addresses match the specified address the sector is determined to be the correct sector. Thus, if one of the copies of the address contains an error, the sector will still be identifiable.

This arrangement is feasible only if the system error rate is fairly low. Otherwise, an unduly large number of copies of the address will be required in each sector to provide, with a reasonable degree of certainty, some minimum number of error-free copies.

One way to eliminate the recording of multiple copies of the address is to encode the sector address using an error correction code (ECC) as set forth in co-pending application Ser. No. 07/070,689 to co-inventors Lih-Jyh Weng and Bernardo Rub entitled "Method and Apparatus for Encoding Magnetic Disk Sector Addresses." The encoded address, which contains t multi-bit address symbols plus a number of redundancy (ECC) symbols, is recorded in the address portion of the sector header. The storage space required for the sector address is thus reduced from that required for multiple copies of the t-symbol address, and a sector address can be correctly identified even though it contains some number of errors, depending on the structure of the particular error correction code.

Specifically, to determine if the sector rotating under the head is the desired sector the retrieved address is compared symbol by symbol with the desired address, after that address has been encoded. If the retrieved address matches the encoded address, or differs by less than some number of symbols, the sector is identified as the correct sector. The advantage of this system over typical error correction encoding systems is that it is not necessary to correct the errors to identify the sector as the correct sector.

The present invention is directed to an improvement over the foregoing system in which encoded addresses are provided with greater address protection against error than is otherwise achieved with the same number of redundancy (ECC) symbols.

SUMMARY

In accordance with the a first embodiment of the present invention an n-bit sector address is encoded using an error correction code such that the address is recorded without adding extra bits, that is, an n-bit encoded address is recorded. Thus the n-bit encoded address can be correctly identified in spite of some specified number of errors, depending on the distance structure of the error correction code, without increasing the number of bits in the address. The invention leaves more disk space available for recording data than the encoding system discussed above, which records the address plus some number of multi-bit redundancy symbols.

The invention, which is an improvement over the previously discussed encoding system, takes advantage of the fact that the approximate position of the read/-write heads relative to the disk surfaces is typically known, to within a relatively small number of contiguous tracks. The contiguous tracks, and the sectors within the tracks, constitute a "logical neighborhood".

A header address contains high order bits identifying the logical neighborhood of a sector. Thus two locations with addresses having the same higher order bits are logically close, i.e. within the same neighborhood. The lower order address bits identify the location of the desired sector within the appropriate neighborhood. It is the lower order address bits which must be ascertained during read and write operations.

The invention encodes the n-bit address such that addresses which are in a neighborhood, that is, addresses which are mathematically or numericaly close, are mapped to addresses while differ in at least D−1 bits where the ECC is a distance D code. The ECC used depends on the selected distance D and the selected size of the neighborhood. Encoded addresses which are not in the same neighborhood may differ in fewer than D−1 bits.

In brief summary, each original n-bit sector address is separated into two segments. One segment is a "k"-bit neighborhood address segment containing the k lower order, that is, least significant, address bits. These bits identify the location of the selected sector within a neighborhood. The second segment is an "n-k" bit higher order address segment containing the most significant sector address bits. These bits identify the neighborhood containing the selected sector. The k-bit neighborhood address segment is then encoded with an (n,k) distance D linear code to form an n-bit preliminary code word containing n-k redundancy (ECC) bits appended, as the most significant bits, to the k neighborhood address bits.

The (n-k)-bit higher order address segment is encoded by representing the segment in Gray code. The (n-k)-bit Gray coded segment is added modulo 2, that is, exclusive OR'd, to the n-k redundancy (ECC) bits of the preliminary code word, thus retaining the n-bit length of the address code word. The resulting address code word is then recorded on the disk as the sector address.

When a particular sector is to be accessed, the address is first encoded in the manner set forth above, and the read/write head is moved to the logical neighborhood containing the sector. The encoded address is then compared, as discussed in reference to the previous encoding scheme, to the addresses written in the various sectors in the neighborhood. When a match within (D−2)/2 bits is found, the sector is identified as the correct sector.

In another embodiment the encoded n-bit addresses are further encoded into p-bit addresses. The p-bit addresses contain the n address bits plus p-n redundancy bits. The p-n redundancy bits protect the sector addresses against errors, regardless of the neighborhoods in which the sectors are situated. Encoding the previously encoded n-bit addresses using a (p,n) distance "E" linear code ensures that all the sector addresses will be at least a distance E apart and all addresses within a logical neighborhood will be at least a distance D−1 apart, where D−1>E. Any sector address with fewer than (E−1)/2 errors, regardless of what neighborhood the sector is in, can be correctly identified, and addresses can be correctly identified within a known neighborhood even if they contain up to (D−2)/2 errors, i.e. D>E. Thus the invention provides greater address protection against errors than is otherwise achieved with the same number of redundancy bits.

DESCRIPTION OF THE DRAWINGS

This invention is pointed out with particularity in the appended claims. The above and further advantages of this invention may be better understood by referring to the following description taken in conjunction with the accompanying in which:

DETAILED DESCRIPTION

Figure 1:
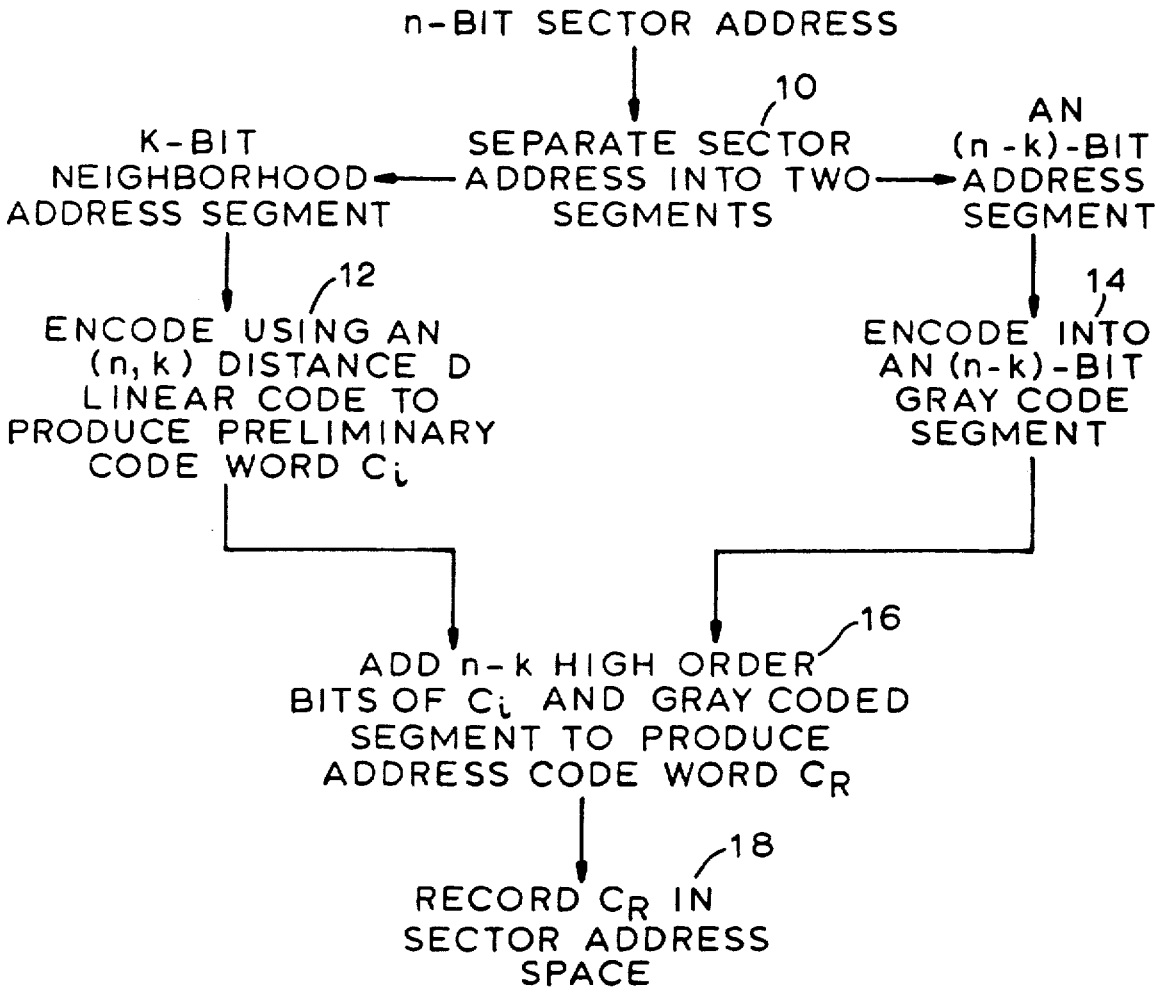
FIG. 1 is a functional block diagram constructed in accordance with the invention.

It should be understood that all addition, subtraction and multiplication operations performed during the encoding and comparison processes are Galois Field operations and the Galois Fields are of the form $GF(2^m)$.

With reference to FIG. 1, an n-bit sector address, identifying one of $2^n$ sectors, is separated into two segments. The first is a k-bit neighborhood address segment containing the k lower order bits, that is, the bits identifying the location of the sector within the appropriate cylinder and/or track. The second segment is an (n-k)-bit address segment containing the higher order bits, that is, the bits identifying the cylinder and/or track containing the sector [Step 10]. The k-bit neighborhood address segment is encoded into an n-bit preliminary code word, $C_i$, using an (n,k) linear systematic code with a distance D [Step 12]. The preliminary code word $C_i$ thus contains n-k redundancy bits as the higher order bits and the k neighborhood address bits as the lower order bits.

The particular (n,k) linear code used to encode the k-bit segment depends on the distance D selected and also on the selected size of a neighborhood. A neighborhood consists of a group of sectors where the absolute difference of two sector addresses is less than $2^k$. If the location of the read/write head is known to within a $2^k$ sector accuracy, a particular sector can be correctly identified, even if it contains up to (D−2)/2 errors. Thus the size of the neighborhood is selected based on the known accuracy of the head positioner.

As an example of the encoding scheme, a seven-bit (n=7) sector address S, S=0101011, is separated into a three bit (k=3) neighborhood address segment 011 and a four bit higher order address segment 0101. The three-bit segment 011 is then encoded by conventional means, using a linear (7,3) code with a selected minimum distance of four (D=4), into a seven-bit preliminary code word, $C_i$=1001011.

The n-k higher order bits are encoded into an (n-k)-bit segment which is the original (n-k)-bit segment represented in Gray code [Step 14]. The encoding is performed by: (i) shifting the (n-k)-bit segment one bit to the right, that is, dropping the least significant bit; (ii) appending a ZERO-bit as the most significant bit to form an (n-k)-bit segment, A; and (iii) exclusive OR'ing the original (n-k)-bit segment to the segment A to form the Gray coded segment. In the example, the four-bit sequence 0101 is shifted one bit to the right and a ZERO bit is appended to form the segment A=0010. The segment A is then added to the original (n-k)-bit address segment to form the Gray coded segment:

0101+0010=0111

Gray coding ensures that any two addresses which differ numerically by a value of one will differ in only one bit. The selected size of a neighborhood ensures that the higher order segments of any two sector addresses in a neighborhood will differ by at most a value of one. Thus any two Gray coded segments associated with sectors within a neighborhood are either identical or, because of the Gray coding, differ in at most one bit.

The Gray coded segment is exclusive OR'd to the n-k high order bits of the preliminary code word $C_i$ to form an address code word, $C_R$ [Step 15]. This changes the distance between any two neighborhood code words by at most one bit, that is, to a minimum distance of $D-1$, because of the distance structure of the Gray code. If the (n-k)-bit address segments were not Gray coded before adding them to the preliminary code words $C_i$, the distance structure of the encoded addresses would change significantly due to the multi-bit differences between the numerically close segments.

The address code word, $C_R$, is then recorded as the sector address [Step 16]. Thus in the example preliminary code word $C_i$ and the Gray coded segment are added to produce the address code word, $C_R$, which is recorded as the sector address:

$$1001011+0111000=1110011=C_R$$

If the position of the read/write head is known to be within $2^k$ sectors of the desired sector, eight sectors in this example, the desired sector can be correctly identified even if it contains $(D-2)/2$ errors. This distance feature is achieved without adding additional bits to the n-bit sector address.

In order to access an identified sector, the address is encoded in the manner set forth above, and the encoded address is compared, that is, to the addresses read from the disk. If there are less than $(D-2)/2$ differences between the two addresses, the sector is the correct sector.

Encoded sector addresses $C_R$ can be translated into the original n-bit address by inverse mapping. First the k least significant bits of $C_R$, which are the same as the k least significant bits of the original address, are encoded using the same (n,k) linear distance D code to form the corresponding preliminary code word $C_i$. Next the preliminary code word $C_i$ is added to the code word $C_R$ to obtain an n-bit word which has k all-ZERO least significant bits and n-k Gray coded bits. Then the inverse Gray code for the n-k most significant bits $w_1$, $w_2$, $w_3 \ldots w_{n-k}$ is calculated by: (i) using the most significant bit $w_1$, as the most significant bit, $a_1$, of the original address; (ii) adding $a_1$ to $w_2$, the next most significant bit, to calculate the next address bit, $a_2$; and (iii) repeating steps (i)–(ii) for each of the n-k bits.

Thus code word $C_R=1110011$ is inversely mapped by encoding the three least significant bits 011 using the (7,3) distance four code into preliminary code word $C_1=1001011$. Next $C_R$ is added to $C_i$ $$1110011+1001011=0111000$$

resulting in the Gray coded word. Then the inverse Gray code of the four most significant bits is calculated:

$$w_1=0$$

$$w_2=0+1=1$$

$$w_3+1+1=0$$

$$w_4=0+1=1$$

and the result is appended, as the n-k most significant bits, to the k least significant bits of $C_R$ to obtain the original address 0101011. Inverse mapping, which takes a relatively long time, is done only during "start-up" procedure to determine the position of the read/write head. It cannot be performed in the short time it takes for a sector address to rotate under the head during read or write operations.

A second embodiment of the invention further encodes the n-bit code word $C_R$ into a "p"-bit code word, $C_P$, containing n information bits and p-n redundancy bits, using an (n,p) distance E linear code. The p-bit code word $C_P$ is then recorded as the sector address. Thus each sector address, regardless of the neighborhood, is at least a distance of E from any other address. In addition, for sectors within a $2^k$ neighborhood, each address is at least a distance $D-1$ from any other neighborhood address. Thus greater distance or error protection, $(D-1)>E$, is achieved than is otherwise achieved using the same number of redundancy bits.

The inverse mapping of the p-bit address $C_P$ into the original n-bit address is the same as the inverse mapping scheme discussed above, except that the p-bit code word $C_P$ is first decoded using conventional means to recover the n-bit code word $C_R$.

Sector addresses consisting of n multi-bit symbols can be similarly encoded over $GF(2^m)$ using the (n,k) and (p,n) codes. The Gray code encoding is performed in the binary field GF(2), however, the distance structure of the Gray code is retained in $GF(2^m)$, that is, encoded adjacent high order (n-k) symbol address segments will differ by at most one symbol.

Each of the address encoding schemes discussed above offer error protection to an n-symbol sector address using a minimum number of error protection symbols. Thus more disk storage space is left free for data storage. This is particularly important as the density of data recording is repeatedly increased to allow more data to be recorded on a given size disk.

The foregoing description has been limited to two specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method for locating data sectors on a magnetic disk during sector seeking operations comprising the steps of:

A. encoding the addresses of the sectors to produce address code words by:

1. separating the sector address containing n bits into two segments, a segment containing the k lower order bits and a segment containing the n-k higher order bits;
2. using a distance D linear (n,k) code over Galois Field GF(2) to encode said k-bit segment into an n-bit code word containing n-k redundancy symbols and the k address bits [such that any two encoded addresses differ by at least D-½ bits] *such that any two n-bit code words corresponding to sectors within a $2^k$ neighborhood differ in at least D bits;*
3. representing said n-k [redundancy symbol] *higher order bit* segment in Gray code;
4. adding said Gray coded segment to the n-k higher order bits of said n-bit code word to produce an n-bit address code word, *said n-bit address code word differing from any n-bit address code word corresponding to a sector which is within*

*a $2^k$ neighborhood of said sector in at least $D-1$ bits;*

B. recording said address code words in the sectors during the formatting of the disk;

C. reading said address code word from the sector rotating under the head, *said sector being within a $2^k$ neighborhood of the sector to be located;*

D. encoding the specified address of the sector to be located in the same manner of step A to produce a specified address code word;

E. comparing said sector address code word read from a disk sector with said specified address code word;

F. (1) if the comparison results in a number of bits which differ between said address code word and said specified address code word that is less than a predetermined number, identifying the sector as a correct sector; or (2) if the comparison results in a number of bits which differ that is greater than said predetermined number, not identifying the sector as the correct sector.

2. The method of claim 1 wherein said encoding step further includes encoding said n-bit address code word using a (p,n) distance E linear code over Galois Field GF(2) to produce p-n redundancy symbols and appending said redundancy symbols to said n-bit address code word to form a p-bit address code word such that the p-bit address code word differs from any other p-bit address codeword by at least E[-½] bits *and differs from any other p-bit address code word in a $2^k$ neighborhood of said sector in at least $D-1$ bits, where $D-1.E$.*

[3. The method of claim 2 wherein said encoding step further includes encoding said n-symbol address code word using a (p,n) distance E linear code over Galois Field GF($2^m$) to produce p-n redundancy symbols and appending said redundancy symbols to said n-symbol address code word to form a p-symbol address code word such that the p-symbol address code word differs from any other p-symbol address codeword by at least E-½ symbols.]

4. The method of claim 1 wherein said comparison step further includes adding modulo 2 said address code words and said specified address code words.

5. A method for locating data sectors on a magnetic disk during sector seeking operations comprising the steps of:

A. encoding the addresses of the sectors to produce address code words by:

1. separating the sector address containing n m-bit symbols into two segments, a k lower order symbol segment and an n-k higher order symbol segment;

2. using a distance D linear (n,k) code over Galois Field GF($2^m$) to encode said k-symbol segment in an n-symbol code word containing n-k redundancy symbols and the k address symbols;

3. representing said n-k higher order symbol segment in binary Gray code;

4. adding modulo 2 said Gray coded segment to the n-k higher order symbols of said n-symbol code word to produce an n-symbol address code word;

B. recording said address code words in the sectors during the formatting of the disk;

C. reading said address code word from the sector rotating under the head, *said sector being within a $2^{mk}$ neighborhood of the sector to be located;*

D. encoding the specified address of the sector to be located in the same manner of step A to produce a specified address code word;

E. comparing said sector address code word read from a disk sector with said specified address code word;

F. (1) if the comparison results in a number of symbols which differ between said address code word and said specified address code word that is less than a predetermined number, identifying the sector as the correct sector; or (2) if the comparison results in a number of symbols which differ that is greater than said predetermined number, not identifying the sector as the correct sector.

6. An apparatus for locating data sectors on a magnetic disk during sector seeking operations comprising:

A. means for encoding the addresses of the sectors to produce address code words comprising:

1. means for separating the sector address containing n bits into two segments, a k lower order bit segment and an n-k higher order bit segment;

2. means for using a distance D linear (n,k) code over Galois Field GF(2) to encode said k-bit segment into an n-bit code word containing n-k redundancy symbols and the k address bits [such that any two encoded addresses differ by at least D-½ bits; p2] *such that any two n-bit code words corresponding to sectors within a $2^k$ neighborhood differ in at least D bits;*

3. means for representing said n-k [redundancy symbol] *higher order bit* segment in Gray code;

4. means for adding said Gray coded segment to the n-k higher order bits of said n-bit code word to produce an n-bit address code word;

B. means for recording said address code words in the sectors during the formatting of the disk;

C. means for encoding the specified address of the sector to be located in the same manner of step A to produce a specified address code word;

D. means for comparing said address code word read from a disk sector *which is within a $2^k$ neighborhood of the sector to be located* with said specified address code word;

E. (1) if the comparison results in a number of bits which differ between said address code word and said specified address code word that is less than a predetermined number, means for identifying the sector as the correct sector; or (2) if the comparison results in a number of bits which differ that is greater than said predetermined number, not identifying the sector as the correct sector.

7. The apparatus of claim 6 wherein said encoding means further comprises means for encoding said n-bit address code word using a (p,n) distance E linear code over Galois Field GF(2) to produce p-n redundancy symbols and appending said redundancy symbols to said n-bit address code word to form a p-bit address code word such that the p-bit address code word differs from any other p-bit address codeword [by] *in* at least E [-½] bits *and differs from any other p-bit address code word in a $2^k$ neighborhood of said sector by at least $D-1$ bits, where $D-1.E$.*

8. The apparatus of claim 6 wherein said comparison means further includes means for [step further includes] adding modulo 2 said address code words and said specified address code words.

9. An apparatus for locating data sectors on a magnetic disk during sector seeking operations comprising:

A. means for encoding the addresses of the sectors to produce address code words comprising:

1. means for separating the sector address containing n m-bit symbols into two segments, a segment containing k lower order symbols and a segment containing n-k higher order symbols, 2. means for using a distance D linear (n,k) code over Galois Field GF($2^m$) to encode said k-symbol segment into an n-symbol code word containing n-k redundancy symbols and the k address symbols, 3. means for representing said n-k [redundancy] *higher order* symbol segment in binary Gray code, 4. means for adding modulo 2 said Gray coded segment to the n-k higher order symbols of said n-symbol code word to produce an n-symbol address code word;

B. means for recording said address code words in the sectors during the formatting of the disk;

C. means for reading said address code word from the sector rotating under the head, *said sector being within a $2^{mk}$ neighborhood of the sector to be located;*

D. means for encoding the specified address of the sector to be located in the same manner of step A to produce a specified address code word;

E. comparing said sector address code word read from a disk sector with said specified address code word;

F. (1) if the comparison results in a number of symbols which differ between said address code word and said specified address code word that is less than a predetermined number, identifying the sector as the correct sector; or (2) if the comparison results in a number of symbols which differ that is greater than said predetermined number, not identifying the sector as the correct sector.

10. The apparatus of claim 9 wherein said encoding means further comprises means for encoding said n-symbol address code word using a (p,n) distance E linear code over Galois Field GF($2^m$) to produce p-n redundancy symbols and appending said redundancy symbols to said address code word to form a p-symbol address code word such that the p-symbol address code word differs from any other p-symbol address codeword by at least E symbols *and differs from any other p-symbol address code word in a $2^{mk}$ neighborhood of said sector by at least D-1 symbols, where D-1>E.*

11. The apparatus of claim 9 wherein said comparison means further includes means for adding modulo 2 said address code words and said specified address code words.

12. A method for encoding magnetic disk data sector addresses comprising the steps of:

A. encoding the addresses of the sectors to produce address code words by:

1. separating the sector address containing n bits into two segments, a segment containing the k lower order bits and a segment containing the n-k higher order bits;

2. using a distance D linear (n,k) code over Galois Field GF(2) to encode said k-bit segment into an n-bit code word containing n-k redundancy symbols and the k address bits [such that any two encoded addresses differ by at least D-½ bits] *such that any two n-bit code words corresponding to sectors within a $2^k$ neighborhood differ in at least D bits;*

3. representing said n-k [redundancy symbol] *higher order bit* segment in Gray code;

4. adding said Gray coded segment to the n-k higher order bits of said n-bit code word to produce an n-bit address code word; and B. recording said address code words in the sectors during the formatting of the disk.

13. The method of claim 12 wherein said encoding step further includes encoding said n-bit address code word using a distance E linear (p,n) code over Galois Field GF(2) to produce p-n redundancy symbols and appending said redundancy symbols to said n-bit address code word to form a p-bit address code word such that the p-bit address code word differs from any other p-bit address codeword by at least E [-½] bits.

[14. The method of claim 12 wherein said encoding step further includes encoding said n-symbol address codes word using a distance E linear (p,n) code over Galois Field GF(2) to produce p-n redundancy symbols and appending said redundancy symbols to said n-symbol address code word such that the p-symbol address code word differs from any other p-symbol address codeword by at least E-½ symbols.]

15. An apparatus for encoding magnetic disk data sector addresses comprising:

A. means for encoding the addresses of the sectors to produce address code words comprising:

1. means for separating the sector address containing n bits into two segments, a k lower order bit segment and an n-k higher order bit segment;

2. means for using a distance D linear (n,k) code over Galois Field GF(2) to encode said k-bit segment into an n-bit code word containing n-k redundancy symbols and the k address bits [such that any two encoded addresses differ by at least D-½ bits] *such that any two n-bit code words corresponding to sectors within a $2^k$ neighborhood differ in at least D bits;*

3. means for representing said n-k [redundancy symbol] *higher order bit* segment in Gray code;

4. means for adding said Gray coded segment to the n-k higher order bits of said n-bit code word to produce an n-bit address code word; and B. means for recording said address code words in the sectors during the formatting of the disk.

16. The apparatus of claim 15 wherein said encoding means further comprises means for encoding said n-bit address code word using a distance E linear (p,n) code over Galois Field GF(s) to produce p-n redundancy symbols and appending said redundancy symbols to said address code word to form a p-bit address code word such that the p-bit address code word differs from any other p-bit address codeword by at least E [-½] bits.

17. An apparatus for locating a sector on a magnetic disk comprising:

A. means for reading an address code word from the sector rotating under the head;

B. means for encoding the specified address of the sector to be located to produce an address code word comprising:

1. means for separating the sector address containing n bits into two segments, a k lower order bit segment and an n-k higher order bit segment;

2. means for using a distance D linear (n,k) code over Galois Field GF(2) to encode said k-bit segment into an n-bit code word containing n-k redundancy symbols and the k address bits [such that any two encoded addresses differ by at least D-½ bits] *such that any two n-bit code words corresponding to sectors within a $2^k$ neighborhood differ in at least D bits;*

3. means for representing said n-k [redundancy symbol] *higher order bit* segment in Gray code;

4. means for adding said Gray coded segment to the n-k higher order bits of said n-bit code word to produce an n-bit address code word;

C. means for comparing said specified address code word with the sector address code word read from a disk sector, *said disk sector being within a $2^k$ neighborhood of the sector be to located;*

D. (1) if the comparison results in a number of bits which differ between said address code word and said specified address code word that is less than a predetermined number, identifying the sector as the correct sector; or (2) if the comparison results in a number of bits which differ that is greater than said predetermined number, not identifying the sector as the correct sector.

18. The apparatus of claim 17 wherein said comparison means further includes means for adding modulo 2 said address code words and said specified address code words.

19. The apparatus of claim 17 wherein said encoding means further comprises means for encoding said n-bit address code word using a distance E linear (p,n) code over Galois Field GF(2) to produce p-n redundancy symbols and appending said redundancy symbols to said n-bit address code word to form a p-bit address code word such that the p-*bit address code word differs from any other p-bit address codeword by at least E bits and differs from any other p-bit address code word in a $2^k$ neighborhood of said sector by at least D-1 bits, where D-1>E.*

20. A method of locating magnetic disk data sectors comprising the steps of:

A. reading the address code word recorded in the sector rotating under the head;

B. encoding the specified address of the sector to be located by:

1. separating the specified address containing n bits into two segments, a segment containing k lower order bits and a segment containing n-k higher order bits;

2. using a distance D linear (n,k) code over Galois Field GF(2) to encode said k-bit segment into an n-bit code word containing n-k redundancy symbols and the k address bits;

3. representing said n-k [redundancy symbol] *higher order bit* segment in Gray code;

4. adding said Gray coded segment to the n-k higher order bits of said n-bit code word to produce an n-bit address code word;

C. comparing said specified address code word with the address code word read from a disk sector, *said sector being within a $2^k$ neighborhood of the sector to be located;* and D. (1) if the comparison results in a number of bits which differ between said address code word and said specified address code word that is less than a predetermined number, identifying the sector as the correct sector; or (2) if the comparison results in a number of bits which differ that is greater than said predetermined number, not identifying the sector as the correct sector.

21. The method of claim 20 wherein said encoding step further comprises encoding said n-bit address code word using a distance E linear (p,n) code over Galois Field GF(2) to produce p-n redundancy symbols and appending said redundancy symbols to said n-bit address code word to form a p-bit address code word such that the p-bit address code word differs from any other p-bit address codeword by at least E bits *and differs from any other p-bit address code word in a $2^k$ neighborhood of said sector by at least D-1 bits, where D-1>E.*

[22. The apparatus of claim 20 wherein said encoding means further comprises means for encoding sand n-symbol address code word using a distance E linear (p,n) code cover Galois Field GF($2^m$) to produce p-n redundancy symbols and appending said redundancy symbols to said n-symbol address code word to form a p-symbol address code word such that the p-symbol address code word differs from any other p-symbol address codeword by at least E-½ symbols.]

23. The apparatus of claim 20 wherein said comparison means further includes means for adding modulo 2 said address code words and said specified address code words.

[24. The apparatus of claim 20 wherein said comparison means further includes means for adding modulo 2 said address code words and said specified address code words.]

25. An apparatus for encoding magnetic disk sector addresses comprising:

A. means for encoding the addresses of the sectors to produce address code words by:

1. separating the sector address containing n bits into two segments, a segment containing k lower order bits and a segment containing n-k higher order bits;

2. means for using a distance D linear code over Galois Field GF($2^m$) to encode said k-[bit] *symbol* segment into an n-[bit] *symbol* code word containing n-k redundancy symbols and the k address [bits] *symbols*;

3. means for representing said n-k higher order [bit] *symbol* segment in Gray code;

4. means for adding said Gray coded segment to the n-k higher order [bits] *symbols* of said n-[bit] *symbol* code word to produce an n-[bit] *symbol* address code word; and B. means for recording said address code words in the sectors during the formatting of the disk.

26. The apparatus of claim 25 wherein said encoding means further comprises means for encoding said n-[bit] *symbol* address code word using a distance E linear (p,n) code over Galois Field GF($2^m$) to produce p-n redundancy symbols and appending said redundancy symbols to said [n-bit] *n-symbols* address code word to form a p-[bit] *symbol* address code word such that the p-[bit] *symbol* address code word differs from any other p-bit address codeword in at least E [bits] *symbols and differs from any other p-symbol address code word in a $2^{mk}$ neighborhood of said sector by at least D-1 symbols, where D-1>E.*

27. An apparatus for locating sectors on a magnetic disk comprising:

A. means for reading said address code word from the sector rotating under the head;

B. encoding means for encoding the specified address of the sector to be located, said encoding means including:

1. means for separating the sector address containing n [m-bits] *m-bit* symbols into two segments, a segment containing k lower order symbols and a segment containing n-k higher order symbols;

2. means for using a distance D linear (n,k) code over Galois Field GF($2^m$) to encode said k-symbol segment into an n-symbol code word containing n-k redundancy symbols and the k-address symbols [such that any two encoded addresses differ by at least D-½ symbols] *such that any two n-symbol code words corresponding to sectors within a $2^{mk}$ neighborhood differ in at least D symbols;*

3. means for representing said n-k [redundancy] *higher order* symbol segment in Gray code;

4. means for adding said Gray coded segment to the n-k higher order symbols of said n-symbol code word to produce an n-symbol address code word;

C. means for comparing said sector address code word read from a disk sector *which is within a $2^{mk}$ neighborhood of said sector to be located* with said specified address code word;

D. (1) if the comparison results in a number of symbols which differ between said address code word and said specified address code word that is less than a predetermined number, means for identifying the sector as the correct sector; or (2) if the comparison results in a number of symbols which differ that is greater than said predetermined number, not identifying the sector as the correct sector.

28. The apparatus of claim 27 wherein said comparison means further includes means for adding modulo 2 said address code words and said specified address code words.

29. The method of claim 27 wherein said encoding [means] *step* further [comprises means for] *includes* encoding said [n-symbols] *n-symbol* address code word using a distance E linear (p,n) code over Galois Field GF($2^m$) to produce p-n redundancy symbols and appending said redundancy symbols to said [n-symbols] *n-symbol* address code word to form a [p-symbols] *p-symbol* address code word such that the [p-symbols] symbols *p-symbol* address code word differs from any other [p-symbols] *p-symbol* address codeword by at least E[-½] symbols *and differs from any other p-symbol address code word in a $2^{mk}$ neighborhood of said sector by at least D-1 symbols, where D-1 E.*

30. A method for locating data sectors on a magnetic disk during sector seeking operations comprising the steps of:

A. encoding the addresses of the sectors to produce address code words comprising:

1. separating the sector address containing n m-bit symbols into two segments, a k lower order symbol segment and an n-k higher order symbol segment, 2. using a distance D linear (n,k) code over Galois Field GF($2^m$) to encode said k-symbol segment into an n-symbol code word containing n-k redundancy symbols and the k address symbols [such that any two encoded addresses differ by at least D-½ symbols] *such that any two n-symbol code words corresponding to sectors within a $2^{mk}$ neighborhood differ in at least D symbols,*

3. representing said n-k [redundancy] *higher order* symbol segment in binary Gray code, 4. adding modulo 2 said Gray coded segment to the n-k higher order symbols of said n-symbol code word to produce an n-symbol address code word;

5. encoding said [n-bit] *n-symbol* address code word using a distance E linear (p,n) code over Galois Field GF($2^m$) to produce p-n redundancy symbols and appending said redundancy symbols to said n-symbol address code word to form a p-symbol address code word such that the p-symbol address code word differs from any other p-symbol address codeword by at least E[-½ bits] *symbols and differs from any other p-symbol address code word in a $2^{mk}$ neighborhood of said sector by at least D-1 symbols, D-1 .E*; and B. recording said address code words in the sectors during the formatting of the disk;

C. reading said address code word from the sector rotating under the head, *said sector being within a $2^{mk}$ neighborhood of the sector to be located;*

D. encoding the specified address of the sector to be located in the same manner of step A to produce a specified address code word;

E. comparing said sector address code word read from a disk sector with said specified address code word; and F. (1) if the comparison results in a number of symbols which differ between said address code word and said specified address code word that is less than a predetermined number, identifying the sector as the correct sector; or (2) if the comparison results in a number of symbols which differ that is greater than said predetermined number, not identifying the sector as the correct sector.

31. A method for encoding magnetic disk data sector addresses comprising the steps of:

A. encoding the addresses of the sectors to produce address code words by:

1. separating the sector address containing n symbols into two segments, a segment containing the k lower order symbols and a segment containing the n-k higher order symbols;

2. using a distance D linear (n,k) code over Galois Field GF($2^m$) to encode said k-symbol segment into an n-symbol code word containing n-k redundancy symbols and the k address symbols [such that any two encoded addresses differ by at least D-½ symbols] *such that any two n-symbol code words corresponding to sectors within a $2^{mk}$* neighborhood differ in at least D symbols;

3. representing said n-k [redundancy] *higher order* symbol segment in Gray code;

4. adding said Gray coded segment to the n-k higher order symbols of said n-symbol code word to produce an n-symbol address code word; and B. recording said address code words in the sectors during the formatting of the disk.

32. A method of locating magnetic disk data sectors comprising the steps of:

A. reading the address code word recorded in the sector rotating under the head, *said sector being within a $2^{mk}$ neighborhood of the sector to be located;*

B. encoding the specified address of the sector to be located by:

1. separating the specified address containing n symbols into two segments, a segment containing k lower order symbols and a segment containing n-k higher order symbols;
2. using a distance D linear (n,k) code over Galois Field $GF(2^m)$ to encode said k-symbol segment into an n-symbol code word containing n-k redundancy symbols and the k address symbols;
3. representing said n-k [redundancy] *higher order* symbol segment in Gray code;
4. adding said Gray coded segment to the n-k higher order symbols of said n-symbol code word to produce an n-symbol address code word;

C. comparing said specified address code word with the address code word read from a disk sector; and D. (1) if the comparison results in a number of symbols which differ between said address code word and said specified address code word that is less than a predetermined number, identifying the sector as the correct sector; or (2) if the comparison results in a number of symbols which differ that is greater than said predetermined number, not identifying the sector as the correct sector.

33. A method for locating data sectors on a magnetic disk during sector seeking operations comprising the steps of:

A. encoding the addresses of the sectors to produce address code words by:

1. separating the sector address containing n bits into two segments, a segment containing k lower order bits and a segment containing n-k higher order bits;
2. using a distance D linear code over Galois Field GF(2) to encode said k-bit segment into an n-bit code word containing n-k redundancy symbols and the k address bits [such that any two encoded addressed differ by at least D-½ bits] *such that any two n-bit code words corresponding to sectors within a $2^k$ neighborhood differ in at least D bits;*
3. representing said n-k [redundancy symbol] *higher order bit* segment in Gray code;
4. adding said Gray coded segment to the n-k higher order bits of said n-bit code word to produce an n-bit address code word;
5. encoding said n-bit address code word using a distance E linear (p,n) code over Galois Field GF(2) to produce p-n redundancy symbols and appending said redundancy symbols to said n-bit address code word to form a p-bit address code word such that the p-bit address code word differs from any other p-bit address codeword by at least E[-½] bits *and differs from any other p-bit address code word in a $2^k$ neighborhood of said sector by at least D-1 bits, where D-1.E.;*

B. recording said address code words in the sectors during the formatting of the disk;

C. reading said address code word from the sector rotating under the head, *said sector being within a $2^k$ neighborhood of the sector to be located;*

D. encoding the specified address of the sector to be located in the same manner of step A to produce a specified address code word;

E. comparing said sector address code word read from a disk sector with said specified address code word by adding them using modulo 2 addition; and F. (1) if the comparison results in a number of bits which differ between said address code word and said specified address code word that is less than a predetermined number, identifying the sector as the correct sector; or (2) if the comparison results in a number of bits which differ that is greater than said predetermined number, not identifying the sector as the correct sector.

34. An apparatus for locating data sectors on a magnetic disk during sector seeking operations comprising:

A. means for encoding the addresses of the sectors to produce address code words, said encoding means including:

1. means for separating the sector address containing n bits into two segments, a segment containing k lower order bits and a segment containing n-k higher order bits;
2. means for using a distance D linear code over Galois Field GF(2) to encode said k-bit segment into an n-bit code word containing n-k redundancy symbols and the k address bits [such that any two encoded addressed differ by at least D-½ bits] *such that any two n-bit code words corresponding to sectors within a $2^k$ neighborhood differ in at least D bits;*
3. means for representing said n-k [redundancy symbol] *higher order bit* segment in Gray code;
4. means for adding said Gray coded segment to the n-k higher order bits of said n-bit code word to produce an n-bit address code word;
5. means for encoding [aid] *said* n-bit address code word using a distance E linear (p,n) code over Galois Field GF(3) to produce p-n redundancy symbols and appending said redundancy symbols to said n-bit address code word to form a p-bit address code word such that the p-bit address code word differs from any other p-bit address codeword by at least E[-½] bits;

B. means for recording said address code words in the sectors during the formatting of the disk;

C. means for reading said address code word from the sector rotating under the head, *said sector being within a $2^k$ neighborhood of the sector to be located;*

D. means for encoding the specified address of the sector to be located in the same manner of step A to produce a specified address code word;

E. means for comparing said sector address code word read from a disk sector with said specified address code word by adding them using modulo 2 addition; and F. (1) if the comparison results in a number of bits which differ between said address code word and said specified address code word that is less than a predetermined number, means for identifying the sector as the correct sector; and (2) if the comparison results in a number of bits which differ that is greater than said predetermined number, not identifying the sector as the correct sector.

*35. A method for locating data sectors on a magnetic disk during sector seeking operations comprising the steps of:*

*A. encoding the addresses of the sectors to produce address code words by:*

1. separating the sector address containing n bits into two segments, a segment containing the k lower order bits and a segment containing the n-k higher order bits;
2. using a distance D linear (n,k) code over Galois Field GF(2) to encode said k-bit segment into an n-bit code word containing n-k redundancy symbols and the k address bits;
3. representing said n-k higher order bit segment in Gray code;
4. adding said Gray coded segment to the n-k higher order bits of said n-bit code word to produce an n-bit address code word;

B. recording said address code words in the sectors during the formatting of the disk;

C. reading said address code word from the sector rotating under the head, said sector being within a $2^k$ neighborhood of the sector to be located;

D. encoding the specified address of the sector to be located in the same manner of step A to produce a specified address code word;

E. comparing said sector address code word read from a disk sector with said specified address code word;

F. (1) if the comparison results in a number of bits which differ between said address code word and said specified address code word that is less than a predetermined number, identifying the sector as the correct sector; or (2) if the comparison results in a number of bits which differ that is greater than said predetermined number, not identifying the sector as the correct sector.

36. The method of claim 35 wherein said encoding step further includes encoding said n-bit address code word using a (p,n) distance E linear code over Galois Field GF (2) to produce p-n redundancy symbols and appending said redundancy symbols to said n-bit address code word to form a p-bit address code word.

37. A method for locating data sectors on a magnetic disk during sector seeking operations comprising the steps of:

A. encoding the addresses of the sectors to produce address code words by:

1. separating the sector address containing n m-bit symbols into two segments, a segment containing the k lower order symbols and a segment containing the n-k higher order symbols;
2. using a distance D linear (n,k) code over Galois Field $GF(2^m)$ to encode said k-symbol segment into an n-symbol code word containing n-k redundancy symbols and the k address symbols;
3. representing said n-k higher order symbol segment in Gray code;
4. adding said Gray coded segment to the n-k higher order symbols of said n-symbol code word to produce an n-symbol address code word;
5. encoding said n-symbol address code word using a (p,n) distance E linear code over Galois Field $GF(2^m)$ to produce p-n redundancy symbols and appending said redundancy symbols to said n-symbol address code word to form a p-symbol address code word;

B. recording said address code words in the sectors during the formatting of the disk;

C. reading said address code word from the sector rotating under the head, said sector being within a $2^{mk}$ neighborhood of the sector to be located;

D. encoding the specified address of the sector to be located in the same manner of step A to produce a specified address code word;

E. comparing said sector address code word read from a disk sector with said specified address code word;

F. (1) if the comparison results in a number of symbols which differ between said address code word and said specified address code word that is less than a predetermined number, identifying the sector as the correct sector; or (2) if the comparison results in a number of symbols which differ that is greater than said predetermined number, not identifying the sector as the correct sector.

38. An apparatus for locating data sectors on a magnetic disk during sector seeking operations comprising:

A. means for encoding the addresses of the sectors to produce address code words comprising:

1. means for separating the sector address containing n bits into two segments, a k lower order bit segment and an n-k higher order bit segment;
2. means for using a distance D linear (n,k) code over Galois Field GF(2) to encode said k-bit segment into an n-bit code word containing n-k redundancy symbols and the k address bits;
3. means for representing said n-k higher order bit segment in Gray code;
4. means for adding said Gray coded segment to the n-k higher order bits of said n-bit code word to produce an n-bit address code word;

B. means for recording said address code words in the sectors during the formatting of the disk;

C. means for encoding the specified address of the sector to be located in the same manner of step A to produce a specified address code word;

D. means for comparing said address code word read from a disk sector which is within a $2^k$ neighborhood of the sector to be located with said specified address code word;

E. (1) if the comparison results in a number of bits which differ between said address code word and said specified address code word that is less than a predetermined number, means for identifying the sector as the correct sector; or (2) if the comparison results in a number of bits which differ that is greater than said predetermined number, not identifying the sector as the correct sector.

39. The apparatus of claim 38 wherein said encoding means further comprises means for encoding said n-bit address code word using a (p,n) distance E linear code over Galois Field GF(2) to produce p-n redundancy symbols and appending said redundancy symbols to said n-bit address code word to form a p-bit address code word.

40. An apparatus for locating a sector on a magnetic disk comprising:

A. means for reading an address code word from the sector rotating under the head;

B. means for encoding the specified address of the sector to be located to produce an address code word comprising:

1. means for separating the sector address containing n bits into two segments, a k lower order bit segment and an n-k higher order bit segment;
2. means for using a distance D linear (n,k) code over Galois Field GF(2) to encode said k-bit segment into an n-bit code word containing n-k redundancy symbols and the k address bits;

3. means for representing said n-k higher order bit segment in Gray code;

4. means for adding said Gray coded segment to the n-k higher order bits of said n-bit code word to produce an n-bit address code word;

C. means for comparing said specified address code word with the sector address code word read from a disk sector, said disk sector being within a $2^k$ neighborhood of the sector be to located;

D. (1) if the comparison results in a number of bits which differ between said address code word and said specified address code word that is less than a predetermined number, identifying the sector as the correct sector; or (2) if the comparison results in a number of bits which differ that is greater than said predetermined number, not identifying the sector as the correct sector.

41. The apparatus of claim 40 wherein said encoding means further comprises means for encoding said n-bit address code word using a distance E linear (p,n) code over Galois Field GF(2) to produce p-n redundancy symbols and appending said redundancy symbols to said n-bit address code word to form a p-bit address code word.

42. A method for encoding magnetic disk data sector addresses comprising the steps of:

A. encoding the addresses of the sectors to produce address code words by:

1. separating the sector address containing n symbols into two segments, a segment containing the k lower order symbols and a segment containing the n-k higher order symbols;

2. using a distance D linear (n,k) code over Galois Field $GF(2^m)$ to encode said k-symbol segment into an n-symbol code word containing n-k redundancy symbols and the k address symbols;

3. representing said n-k higher order symbol segment in Gray code;

4. adding said Gray coded segment to the n-k higher order symbols of said n-symbol code word to produce an n-symbol address code word; and B. recording said address code words in the sectors during the formatting of the disk.

43. An apparatus for encoding magnetic disk sector addresses comprising:

A. means for encoding the addresses of the sectors to produce address code words by:

1. separating the sector address containing n bits into two segments, a segment containing k lower order bits and a segment containing n-k higher order bits;

2. means for using a distance D linear code over Galois Field GF(2) to encode said k-bit segment into an n-bit code word containing n-k redundancy symbols and the k address bits;

3. means for representing said n-k higher order bit segment in Gray code;

4. means for adding said Gray coded segment to the n-k higher order bits of said n-bit code word to produce an n-bit address code word; and B. means for recording said address code words in the sectors during the formatting of the disk.

44. The method of claim 5, wherein said encoding step further includes encoding said n-symbol address code word using a (p,n) distance E linear code over Galois Field $GF(2^m)$ to produce p-n redundancy symbols and appending said redundancy symbols to said n-symbol address code word to form a p-symbol address code word such that the p-symbol address code word differs from any other p-symbol address codeword by at least E symbols.

45. The method of claim 31 wherein said encoding step further includes encoding said n-symbol address code word using a (p,n) distance E linear code over Galois Field $GF(2^m)$ to produce p-n redundancy symbols and appending said redundancy symbols to said n-symbol address code word to form a p-symbol address code word such that the p-symbol address code word differs from any other p-symbol address codeword by at least E symbols.

* * * * *